(12) United States Patent
Chew

(10) Patent No.: US 7,887,708 B2
(45) Date of Patent: Feb. 15, 2011

(54) METHOD AND DEVICE FOR WATER TREATMENT USING AN ELECTROMAGNETIC FIELD

(75) Inventor: Hwee Hong Chew, Singapore (SG)

(73) Assignee: Mass Technology (H.K.) Limited (HK)

( * ) Notice: Subject to any disclaimer, the term of this patent is extended or adjusted under 35 U.S.C. 154(b) by 1062 days.

(21) Appl. No.: 11/241,122

(22) Filed: Sep. 30, 2005

(65) Prior Publication Data

US 2007/0029261 A1    Feb. 8, 2007

(30) Foreign Application Priority Data

Aug. 2, 2005    (SG) .............................. 200504678-4

(51) Int. Cl.
*B01D 35/06* (2006.01)
*C02F 1/48* (2006.01)

(52) U.S. Cl. ................. 210/695; 210/222; 210/223; 210/748.01; 210/748.03; 210/748.04; 204/155; 204/554; 204/555; 204/557; 204/660; 204/661; 204/664

(58) Field of Classification Search ................. 210/222, 210/223, 243, 695, 748, 748.01, 748.03, 210/748.04; 204/155, 554, 555, 557, 660, 204/661, 664
See application file for complete search history.

(56) References Cited

U.S. PATENT DOCUMENTS

| | | |
|---|---|---|
| 438,579 A | 10/1890 | Faunce et al. |
| 2,583,522 A | 1/1952 | Winslow et al. |
| 2,652,925 A | 9/1953 | Vermeiren |
| 2,825,464 A | 3/1958 | Mack |
| 3,349,354 A | 10/1967 | Miyata |
| 3,366,564 A | 1/1968 | Allen |
| 3,402,120 A | 9/1968 | Allen et al. |
| 3,625,884 A | 12/1971 | Waltrip |
| 3,669,274 A | 6/1972 | Happ et al. |
| 3,680,705 A | 8/1972 | Happ et al. |
| 3,715,305 A | 2/1973 | Carnes et al. |
| 3,923,660 A | 12/1975 | Kottmeier |
| 4,151,090 A | 4/1979 | Brigante |
| 4,157,963 A | 6/1979 | Jessop et al. |
| 4,210,535 A | 7/1980 | Risk |
| 4,226,720 A | 10/1980 | Brigante |
| 4,288,323 A | 9/1981 | Brigante |
| 4,347,133 A | 8/1982 | Brigante |
| 4,365,975 A | 12/1982 | Williams et al. |
| 4,427,544 A | 1/1984 | Roch |

(Continued)

OTHER PUBLICATIONS

Shinji Isogai et al., "Measurement and Modeling for the Mitigation of Organic Crystallization Fouling", 2003 ECI Conference on Heat Exchanger Fouling and Cleaning: Fundamentals and Applications, 2004.

(Continued)

*Primary Examiner*—David A Reifsnyder
(74) *Attorney, Agent, or Firm*—Moore & Van Allen PLLC; R. Brian Drozd; Michael G. Johnston (57) ABSTRACT

A method and a device for treating water using an electromagnetic field. The method comprising the steps of subjecting the water to the electromagnetic field generated utilizing an inductor coil; and varying a frequency of a driving signal for the inductor coil such that the generated electromagnetic field has a varying frequency.

18 Claims, 5 Drawing Sheets

U.S. PATENT DOCUMENTS

| | | | |
|---|---|---|---|
| 4,582,629 A | | 4/1986 | Wolf |
| 4,680,114 A | | 7/1987 | Hayes |
| 4,865,748 A | | 9/1989 | Morse |
| 4,936,979 A | | 6/1990 | Brown |
| 5,171,431 A | * | 12/1992 | Schulte .................. 210/222 |
| 5,344,531 A | | 9/1994 | Saito et al. |
| 5,364,512 A | | 11/1994 | Earl |
| 5,514,283 A | * | 5/1996 | Stefanini ................. 210/695 |
| 5,738,766 A | * | 4/1998 | Jefferson ................. 210/222 |
| 6,401,834 B1 | | 6/2002 | Yeomans |
| 6,743,366 B2 | * | 6/2004 | Telfer et al. ............. 210/695 |

OTHER PUBLICATIONS

Fahmi Brahim et al., "Numerical Simulation of the Fouling on Structured Heat Transfer Surfaces (Fouling)", 2003 ECI Conference on Heat Exchanger Fouling and Cleaning: Fundamentals and Applications, 2004.

Feridoun Fahiminia et al., "Investigation of Initial Fouling Rates of Calcium Sulfate Solutions under Non-Boiling Conditions (Work-in-Progress)", 2003 ECI Conference on Heat Exchanger Fouling and Cleaning: Fundamentals and Applications, 2004.

Y I Cho et al., "Use of electronic anti-fouling technology with filtration to prevent fouling in a heat exchanger", 1998.

Esospec Global Technology PTE LTD., "International Search Report", PCT/SG2006/000218, Sep. 22, 2006.

* cited by examiner

METHOD AND DEVICE FOR WATER TREATMENT USING AN ELECTROMAGNETIC FIELD

FIELD OF INVENTION

The present invention relates broadly to a method and a device for treating water using an electromagnetic field.

BACKGROUND

Water quality requirements are usually determined from the usage of the water. Water can be broadly classified as potable and non-potable. Non-potable water is used mainly for industrial purposes, such as cleaning, production of non-food items and raw materials, utilitarian facilities systems such as cooling towers, boilers and condensers and domestic purposes in fountains, swimming pools and home ponds. Potable water is used mainly for water distribution systems in schools, hospitals and homes.

Three main problems are identified for water and its usages. They are namely fouling, corrosion and bacterial contamination. Generally, when fouling occurs, layers of scale will form. Scaling greatly decreases heat efficiency, increases the chiller pressure and increases the power consumption. It has been reported that there is a 25% increase of electrical consumption when the scale thickness is ⅛ inch. The effects of scale formation in water heating systems are also apparent in homes. Significant cost is incurred for cleaning up these deposits.

Further, scale causes parts such as valves to malfunction and results in leaks. Scaling also creates an oxygen-deprived environment under the deposits which favours growth of anaerobic bacteria, which in turn induces further problems of corrosion. In particular, staining on pipes and facilities such as fountains may be induced.

The second main problem identified is corrosion. Corrosion is the process of metal dissolution, usually by oxidation. It results in substantial material breakdown and premature degradation of system equipment. As a result, the quality of the original material becomes inferior after corrosion. There will be a direct decrease in strength of the materials, reduction in thickness and in certain cases, pit formation. Corrosion also result in serious leaking problems and malfunction of the systems.

The third main problem identified is bacterial contamination. Diverse species of bacteria can be found in both the natural and the human environment. These micro-organisms are able to affect human health to a great extent. Due to the wide diversity of existing bacteria, it is difficult to identify and combat them. Thus, there is a need to control bacteria growth in water to protect human health from being affected. Further, bacteria growth control will help in preventing other bacteria induced problems.

Therefore, water treatment is essential for controlling fouling, corrosion and bacterial contamination. There are various water treatment methods and they may be divided basically into physical and chemical treatment methods. These methods are then further classified according to their techniques based on the requirements of the various purposes of water treatment.

In general, chemical treatment methods require a great amount of maintenance as periodic dosing needs to be carried out and in accurate and controlled amounts for effective control and may use chemicals that are especially harmful to human health, suspected to possess carcinogenic effects, and pose a threat to the environment.

Use of magnetic fields has been suggested to prevent scale formation by using magnetic fields strength to cause molecular changes or solution properties to prevent the bonding of scale-forming particles. For example, permanent magnets have also been used, but were found to cause the formation of soft sludge over the formation of hard scale that tends to cling to the surface. The effect of scale control is greatly limited by such conditions.

Use of electromagnetic fields for water treatment has been suggested. For example, U.S. Pat. No. 438,579 discloses a device which uses electromagnetic fields generated by electromagnets with electric coils positioned at right angles to the conduit on which they are mounted. However, mechanical failure in these devices could cause the cores of the electromagnets to stop rotating.

In U.S. Pat. No. 4,865,748, electromagnetic test signals of varied frequency are initially directed into a fluid filled system at a first location. A treatment frequency, generally the frequency at which maximum absorption is observed, is then selected from such absorption/emission profile and treatment is carried out at such selected fixed frequency.

Irradiation by UV radiation has also been suggested to distort or destroy nucleic acids, however, UV radiation was found not capable of effectively breaking up the biofilm and is costly and harmful to human health.

Other technologies now make use of high power consumption electrohydraulic shock treatment utilising the physical and electrochemical effects of the electrostatic field to disperse bacteria and scale particles to prevent them from forming together. However, bacterial counts cannot be controlled. Also, the only means to help prevent corrosion in such treatments is through the control of biofouling and not directly dealing with corrosion itself.

However, the existing water treatment methods are typically designed to solve a certain particular problem. It should be noted that when one problem is not addressed properly, it could lead to other problems. The existing water treatment methods are inadequate for situations where multiple and interrelated problems arise, such as e.g. in cooling towers.

There is therefore a need for providing an alternative treatment method and system which may address one or more of the above disadvantages.

SUMMARY

In accordance with a first aspect of the present invention, there is provided a method for treating water using an electromagnetic field, the method comprising the steps of: subjecting the water to the electromagnetic field generated utilising an inductor coil; and varying a frequency of a driving signal for the inductor coil such that the generated electromagnetic field has a varying frequency.

The frequency of the driving signal for the inductor coil may be varied such that two or more treatment effects are electro-magnetically induced in the water.

The electromagnetic field may have a varying polarity.

The two or more treatment effects may relate to one or more of a group consisting of controlling scale formation, controlling bacteria growth, and forming magnetite to prevent corrosion.

The method may further comprise simultaneously applying one or more existing treatment techniques to the water.

The frequency range may be between 1 kHz and 500 kHz.

In accordance with a second aspect of the present invention, there is provided a system for treating water using an electromagnetic field, the system comprising: an inductor coil for subjecting the water to the electromagnetic field; a driver unit coupled to the inductor coil; and a controller unit coupled to the driver unit for varying a frequency of a driving signal generated by the driver unit such that the generated electromagnetic field has a varying frequency.

The inductor coil may have electromagnetic field with varying frequency such that two or more treatment effects are electro-magnetically induced in the water.

The inductor coil may have electromagnetic field with varying polarity.

The system may further comprise means of achieving two or more treatment effects relating to one or more of a group consisting of controlling scale formation, controlling bacteria growth, and forming magnetite to prevent corrosion.

The controller unit may comprise a programmable Integrated Circuit (IC).

The driver unit may comprise a bridge-type circuit and two half-bridge actuator ICs.

The bridge-type circuit of the driver unit may comprise a plurality of Metal Oxide Semiconductor Field Effect Transistors (MOSFETs).

The system may further comprise a power source for providing supply voltages to components of the device.

The controller unit may comprise a stabilizer circuit coupled between the power source and the controller unit.

The power source may provide an input signal to the driver unit for generation of the driving signal.

The inductor coils may be formed on a surface of a pipe, container or reservoir.

The inductor coils may be formed such that the pipe, container or reservoir is located substantially inside the coil or adjacent the coil The inductor coils may be formed on a separate carrier structure for disposal adjacent a pipe, container or reservoir.

The inductor coil may have electromagnetic field with varying frequency ranging between 1 kHz and 500 kHz.

BRIEF DESCRIPTION OF DRAWINGS

Embodiments of the invention will be better understood and readily apparent to one of ordinary skill in the art from the following written description, by way of example only, and in conjunction with the drawings, in which.

DESCRIPTION

Figure 1:
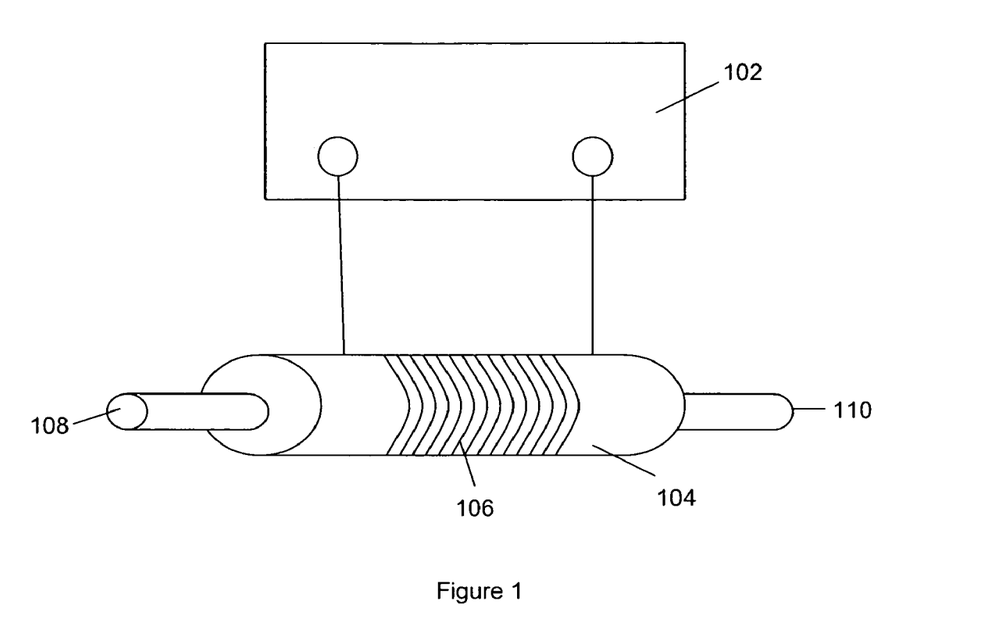
FIG. 1 is a schematic diagram of an installation layout of a water treatment device using electromagnetic waves in an example embodiment of the present invention.

FIG. 1 is a schematic diagram of an installation layout of a water treatment device using electromagnetic waves in an example embodiment. The device 100 comprises a descaler unit 102, a pipe 104 and an electromagnetic inductor coil 106.

The descaler unit 102 is coupled to the electromagnetic inductor coil 106, which is wound around the pipe 104.

The descaler unit 102 generates electromagnetic waves according to requirements set by the user in the example embodiment. The electromagnetic field is then generated within the electromagnetic inductor coil 106. The water is treated after it flows into a fluid inlet 108 of the pipe 104 and out from a fluid outlet 110 of the pipe 104. The water is subjected to the effects of the electromagnetic field generated within the electromagnetic inductor coil 106 when it flows through the pipe and thus through the electromagnetic inductor coil 106. The treated water that flows through the pipe 104 may be recirculated by a driving pressure or by natural flow.

It is noted that the water to be treated may not have to flow through the electromagnetic inductor coil 106 in different embodiments. Similarly, the pipe 104 may not have to be placed in the electromagnetic inductor coil 106. Rather, it will be appreciated that the water can be treated as long as the water is within the influence of the electromagnetic field generated by a treatment element according to an example embodiment.

In other words, the shape of the treatment element is not limited to a coil wound around a pipe. The treatment element can e.g. be formed as a separate component and be placed adjacent the pipes, containers or reservoirs containing the water in example embodiments. The treatment element can also be formed on the surfaces of the pipes, containers and reservoirs.

FIGS. 2a to 2d show four different configurations of treatment elements 200a, 200b, 200c and 200d in the example embodiments. The treatment elements 200a, 200b, 200c and 200d are placed on separate carrier structures 202a, 202b, 202c and 202d respectively. The carrier structures 202a, 202b, 202c and 202d can be placed adjacent the pipes, containers or reservoirs containing the water or formed on the surfaces of the pipes, containers and reservoirs in example embodiment.

Figure 2A:
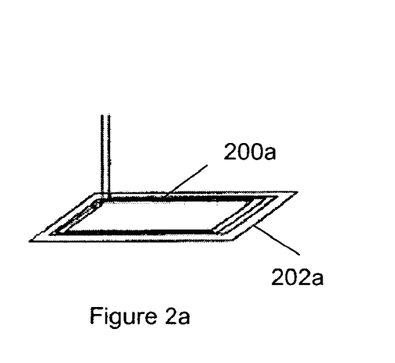
FIGS. 2a to 2d show four different variations of an electromagnetic inductor coil in an example embodiment of the present invention.
Figure 2B:
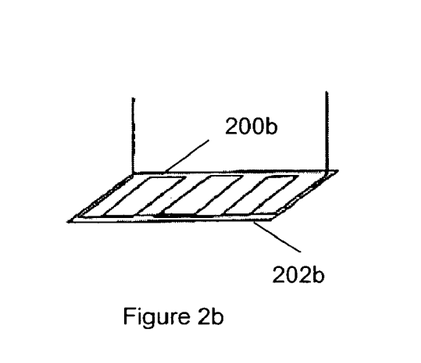
Figure 2C:
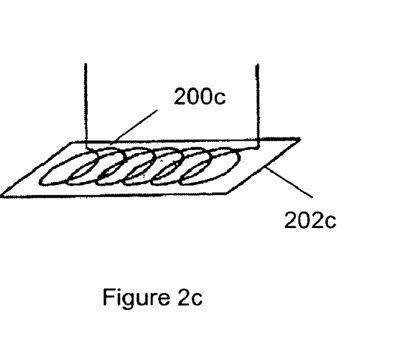
Figure 2D:
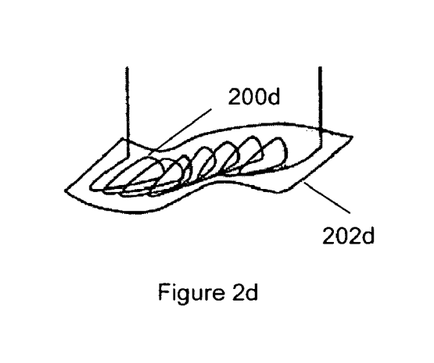

It is observed in FIG. 2d that the shape of the carrier structure 202d can be irregular in an example embodiment. This enables the carrier structure 202d to be placed on irregular surfaces or to be formed on irregular surfaces of the pipes, containers and reservoirs.

Referring back to FIG. 1, the diameter of the pipe 104 may range e.g. from 0.5 to 20 inches or greater in the example embodiment. The number of turns of the electromagnetic inductor coil 106 is determined according to the current flow through the wire. The current through the electromagnetic inductor coil 106 may range from 0.1 to 10 amperes (A) in the example embodiments. However, the exact current is dependent on the actual requirements.

In the example embodiment, the pipe 104 for winding the electromagnetic inductor coil 106 is not limited to the shape as shown in FIG. 1. The pipe 104 may be in a number of different shapes, such as round, rectangular, square, triangle or any other suitable shape to suit different uses.

Figure 3:
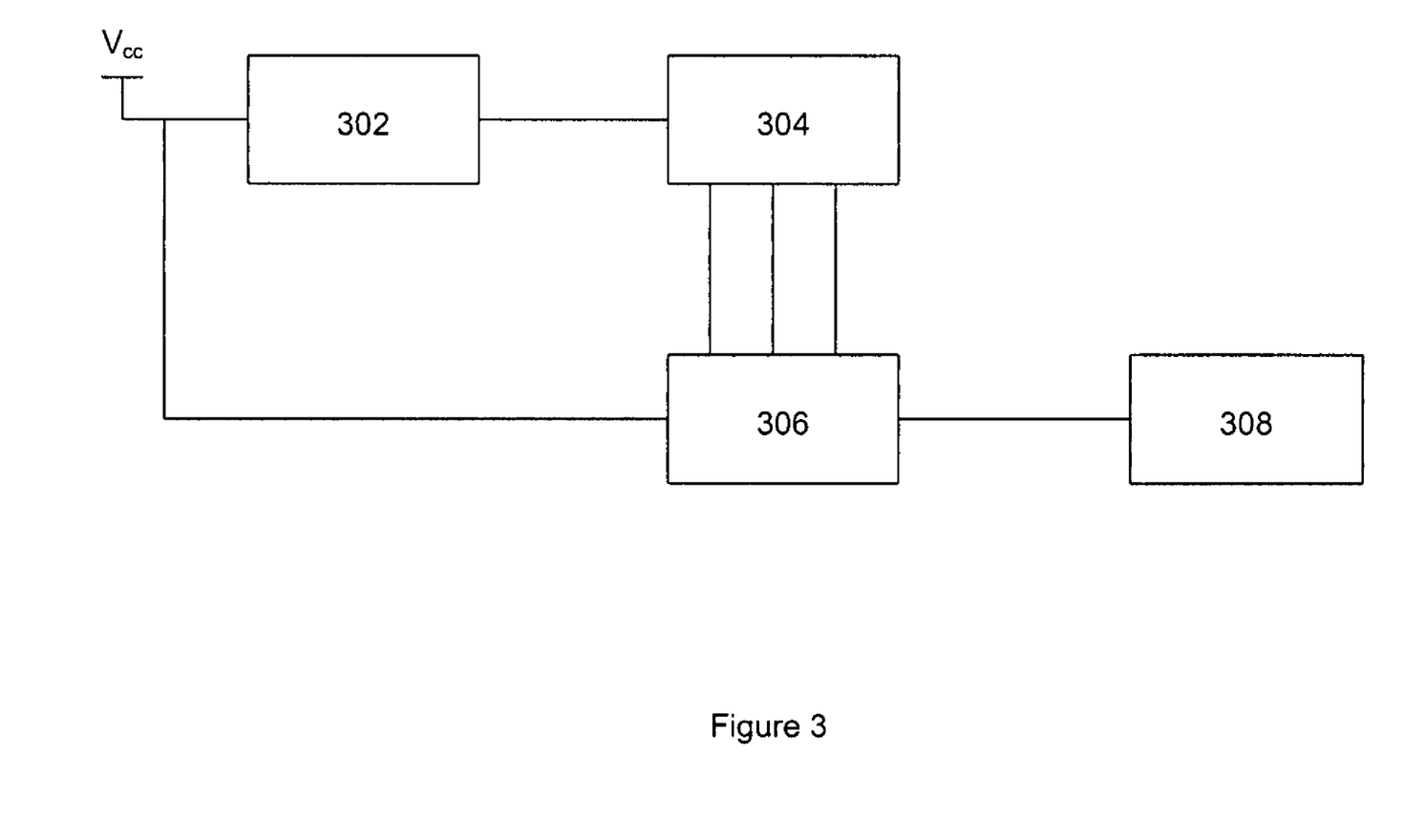
FIG. 3 is a schematic circuit diagram of the electrical implementation of the device according to an example embodiment of the present invention.

FIG. 3 shows a block diagram of the electrical implementation in the example embodiment. The device comprises of a voltage stabilizing unit 302, a control unit 304, an electromagnetic wave generator 306 and an electromagnetic inductor coil 308. Both the voltage stabilizing unit 302 and the electromagnetic wave generator 306 are connected to a voltage supply of $V_{cc}$.

The voltage $V_{cc}$ is supplied from the adjustable on/off power supply (not shown) which is connected to the main power source (not shown). The voltage $V_{cc}$ may be set at a value ranging from above 36 to 48V in the example embodiment. The voltage stabilizing unit 302 converts the voltage $V_{cc}$ to a stable 5V direct voltage in order to provide a stable working power supply to the control unit 304 in the example embodiment.

The control unit 304 is programmable and produces three output signals to the electromagnetic wave generator 306 in the example embodiment. The electromagnetic wave generator 306 is connected to the electromagnetic inductor coil 308 and provides the electromagnetic signal output to the electromagnetic inductor coil 308.

Figure 4:
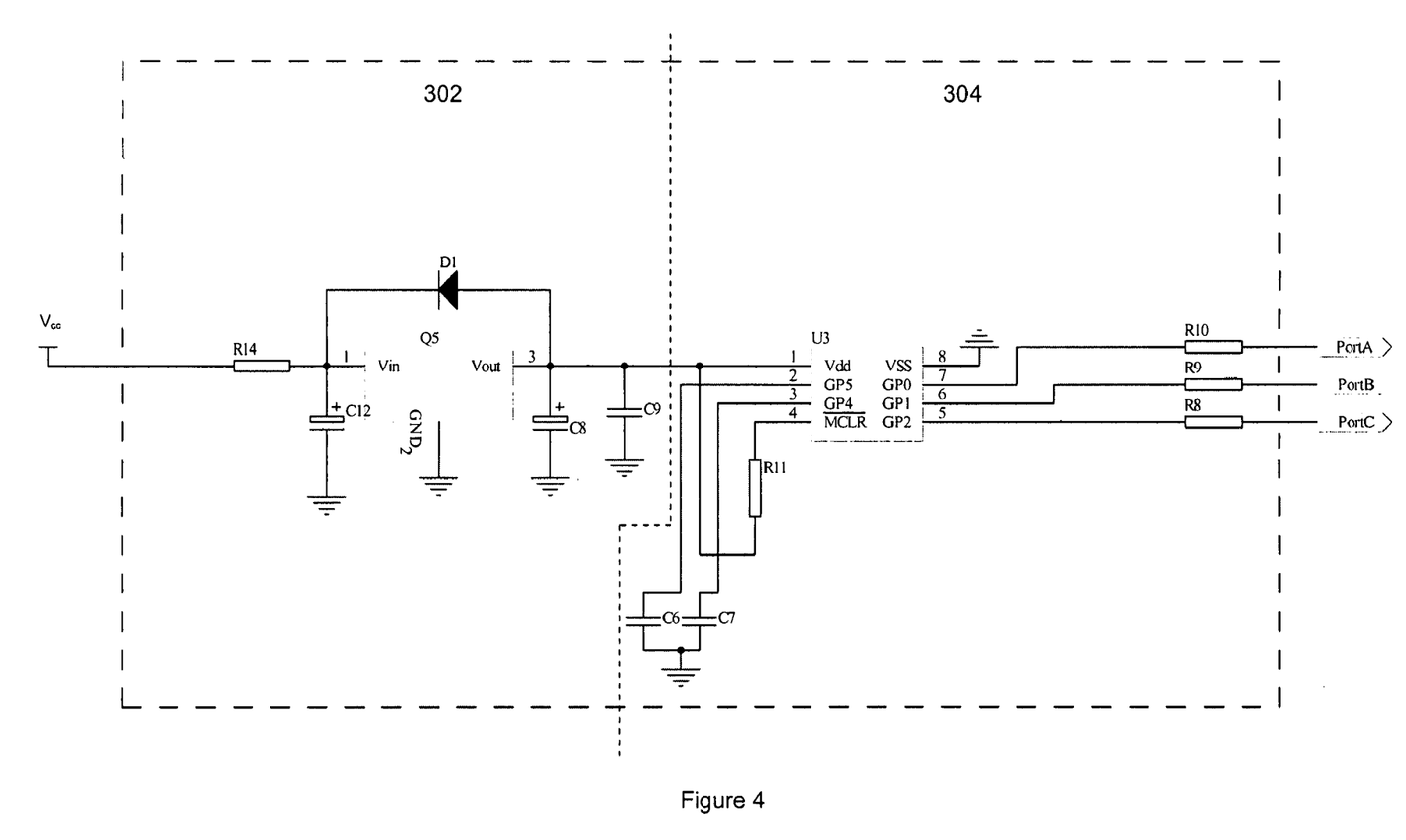
FIG. 4 is a circuit diagram of details of the electrical implementation of the device according to an example embodiment of the present invention.

The operation of the device will now be described in more detail with reference to FIGS. 4 and 5. FIG. 4 shows the circuit diagram of the voltage stabilizing unit 302 and the control unit 304 in the example embodiment. The voltage stabilizing unit 302 comprises a voltage stabilizer Q5, a resistor R14, capacitors C8, C9, C12 and a diode D1.

In the example embodiment, one end of the resistors R14 is connected in line with the supply voltage $V_{cc}$ and is connected to the $V_{in}$ port of the voltage stabilizer Q5. The capacitor C12 is connected between the $V_{in}$ port of the voltage stabilizer Q5 and ground. The capacitors C8 and C9 are connected between the $V_{out}$ port of the voltage stabilizer Q5 and ground. In the example embodiment, capacitors C12 and C8 are capacitors having a defined polarity. The positive and negative poles of the diode D1 are connected to the $V_{out}$ port and the $V_{in}$ port of the voltage stabilizer Q5 respectively.

The control unit 304 comprises a programmable chip U3, resistors R8, R9, R10 and R11, and capacitors C6 and C7 in the example embodiment. The programmable chip U3 is a Microchip Technology Inc. PIC12F675 chip. The $V_{dd}$ port of programmable chip U3 of the control unit 304 is connected to the $V_{out}$ port of the voltage stabilizing unit 302, for provision of the direct voltage of 5V in the example embodiment. The capacitor C6 is connected between GP5 port of the programmable chip U3 and ground. The capacitor C7 is connected between the GP4 port of the programmable chip U3 and ground. The resistor R11 is connected between the $V_{dd}$ port and the $\overline{\text{MCLR}}$ port of the programmable chip U3.

Output signals A, B and C are coupled to the electromagnetic wave generator unit 306 (FIG. 3) from the GP0, GP1 and GP2 ports of the programmable chip U3 via in-line resistors R10, R9, and R8 respectively. The programmable chip U3 of the control unit 304 is programmed to control the output signals A, B, and C. The output signals A, B and C are digital signals. The output signals A and B are exactly opposite to each other in the example embodiment. When the output signal A is high, the output signal B will be low and vice versa. The frequency of the output signal changes in signals A and B are controlled by the programmable chip U3. The output signals A and B in turn control the frequency of the signal fed into the electromagnetic inductor coil 308 (FIG. 3). The output signal C is kept at high or "1" value during treatment operation of the device, and low or "0" at other times.

Figure 5:
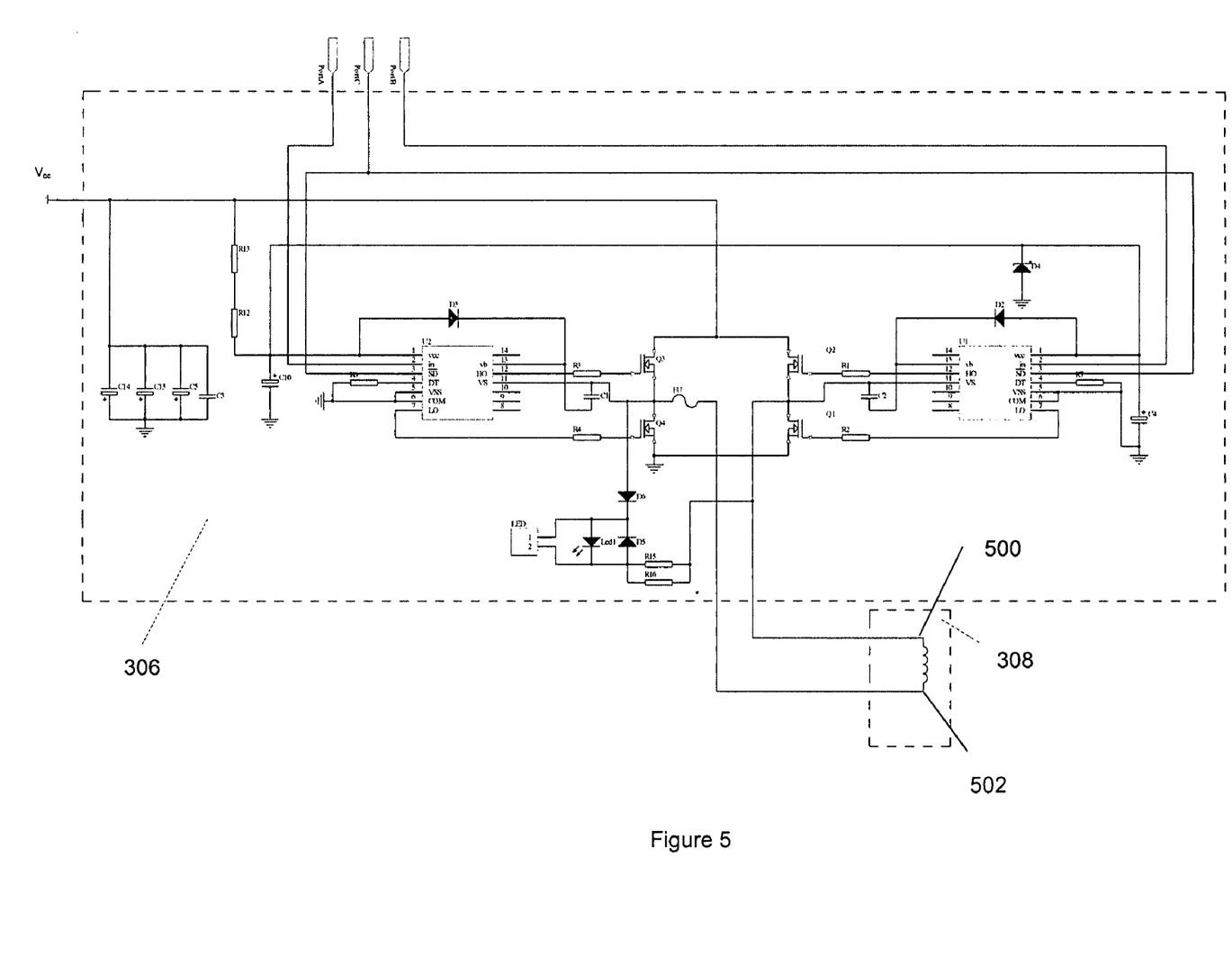
FIG. 5 is a circuit diagram of details of the electrical implementation of the device according to an example embodiment of the present invention.

FIG. 5 shows a circuit diagram of the electromagnetic wave generator 306 in the example embodiment. The three signals A, B and C received at ports A, B, and C respectively are coupled to two programmable chips U1 and U2 of the electromagnetic wave generator 306. The two programmable chips U1 and U2 are International Rectifier half-bridge driver chips IR21094. Port A is coupled to the "in" port of programmable chip U2 and port B is coupled to the "in" port of programmable chip U2 in the example embodiment. Port C is coupled to the $\overline{\text{SD}}$ ports of both programmable chips U1 and U2 in the example embodiment.

When the control signal C is at a high or "1" level, programmable chips U1 and U2 are in operation. When the signal C is at a low or "0" level, programmable chips U1 and U2 are not in operation.

The programmable chip U1 is coupled to MOSFETs Q1 and Q2 while the programmable chip U2 is coupled to MOSFETs Q3 and Q4 in the example embodiment. When the control signal A is high, an activation signal is output from the HO port of the programmable chip U2 to activate the MOSFET Q3, while no activation signal is output from the LO port of programmable chip U2 to MOSFET Q4. The control signal B will be low when the control signal A is high, as described above, and an activation signal is output from the LO port of the programmable chip U1 to activate the MOSFET Q1, while no activation signal is output from the HO port of programmable chip U1 to MOSFET Q2.

MOSFETs Q1, Q2, Q3 and Q4 are arranged in a bridge type circuit between the $V_{cc}$ line and ground. When the MOSFETs Q1 and Q3 are active, $V_{cc}$ is applied across the electromagnetic inductor coil 308 between e.g. points 500 and 502, with point 502 connected to ground. Similarly, when the MOSFETs Q2 and Q4 are active, $V_{cc}$ is applied across the electromagnetic inductor coil 308 between e.g. points 500 and 502, with point 500 connected to ground. Thus, an electromagnetic field of varying polarity is generated by the inductor coil 308, with a frequency of the electromagnetic field controlled by the activation signals to the MOSFETs Q1 to Q4, based on control signals A and B received from the control unit 304 (FIG. 4).

The electromagnetic wave generator 306 further comprises an indicator circuit comprising resistors R15 and R16 and diodes D5 and D6 in the example embodiment. The indicator circuit turns on a light emitting diode LED1 as an indication the electromagnetic wave generator 306 is operating. A filter circuit comprising capacitors C3, C5, C13, C14 is coupled to the $V_{cc}$ line and short circuit protection resistors R12 and R13 are further provided in the example embodiment.

Example embodiments of the present invention may comprise the following features and advantages.

Example embodiments may be able to proportionate the treatment accurately between different frequency values or ranges over a given time period. For example, the frequency value or range with the most desirable effect in a given environment is allocated with a proportionally longer time. Other frequency ranges or values may be allocated time in order of desirability of the associated effects. This can ensure high efficiency, minimize side effects and reduce power consumption.

Example embodiments of the present invention may be more flexible and able to solve multiple problems. In order to obtain the desired water treatment effects, the important factor is the program set in the programmable chip U3 of the control unit 304. This depends on and can be chosen based on a detailed knowledge of the influence of the electromagnetic waves of different frequency ranges on water treatment.

Example embodiments of the present invention address a number of problems using a range of frequency values. In comparison, using a single frequency can at best produce the effects to address a particular problem as identified by typical water treatment devices which claimed to have effects on a single problem. The programmable chip U3 of the example embodiments may be programmed to produce various suitable ranges of frequency to suit the treatment requirements.

Taking water treatment of cooling tower as an example, multiple identified problems may need to be solved. Effects to be achieved include prevention of growth of algae and bacteria, removal of existing scale and prevention of further scale formation, formation of magnetite on the internal surfaces of the pipes and to increase pH for decreasing corrosion tendencies. The problems identified with water may be interrelated. When one problem is not addressed properly, it may lead to the occurrences of other problems. For example, ineffective removal of algae, and scale deposits may result in the growth of bacteria.

To achieve the desired water treatment effects, the programmable chip U3 is programmed to produce signals of frequency range from 5 kHz to 30 kHz and to have a root mean square current value of 2 A to 5 A in the example embodiment. The desired current may be varied by modifying the dimensions of the inductor coil and the number of turns in the inductor coil.

It will be appreciated by a person skilled in the art that the example embodiments of the present invention may not be limited to be used for solving multiple problems. The example embodiments can also be used to solve individual problems more effectively compared to existing water treatment methods.

Example embodiments of the present invention may adopt different frequency ranges for solving individual problems mentioned above in the example embodiment. For example, the recommended frequency range for preventing algae growth may be within 5 kHz to 30 kHz and the required current may range from 0.1 A to 10 A.

In an environment which favours the growth of a number of species of bacteria, such as the cooling water within the cooling towers, the preferred frequency range for water disinfection and killing of bacteria or prevention of bacteria growth may be 5 kHz to 500 kHz. The preferred current range is greater than 500 mA.

Example embodiments of the present invention may use repetition of various frequencies within short time intervals as there is a greater likelihood of influence upon microbial cells. This may be especially useful as the frequency range of each species has yet to been discovered. Comparing the use of single frequency ranges with the example embodiments, the example embodiments may be more suited for utilitarian facility applications having a great variety of bacteria. The example embodiments may not have to use multiple units of generators to provide different frequency ranges to target the many forms of bacteria.

Further, example embodiments of the present invention may control bacteria, especially Legionella, which typically cannot be controlled by a low alkalinity program alone. It may also be unsuitable and impractical to increase temperatures too high within e.g. cooling towers purely for the purpose of dealing with these bacteria even though sufficiently high heat can destroy them by sterilization.

There may be no need for use of chemicals to achieve bacteria control when the example embodiments are used. Compared with using biocides which tend to produce biocide-resistant strains, example embodiments of the present invention can work at the preliminary level of controlling bacteria growth rather than merely killing bacteria, The example embodiments may be effective in maintaining low levels of bacteria count, which may be a preferred method when the level of bacteria has multiplied. To control bacteria growth, the example embodiments may destroy certain functions of the bacteria such as their general metabolism and the means to reproduce. The example embodiments may cause effects such as curling flagella which prevents movement of the bacteria cell to source for food, thus disabling the bacteria means to sustain life.

The preferred frequency range may be within 1 kHz to 200 kHz for the formation of magnetite on the surfaces of steel and iron. Magnetite is useful in preventing corrosion. For example, if magnetite is formed on the internal surfaces of cooling water pipes, it will be effective in preventing corrosion on the internal surfaces of the pipes.

By using the frequency range of 3 kHz to 200 kHz, existing foulants within the water supply systems can be gradually removed and further scale formation can be prevented. Dirt may include but is not limited to scale, organic materials and inorganic materials, barnacles, shell or clams etc. This may be further extended to other applications that need to prevent dirt accumulation, such as offshore sea structures, externals of hulls and cooling tower water pipes.

A frequency range of 100 kHz to 150 kHz may be used to gradually increase the pH of the treated water assuming there are no external factors involved. This can be applied to closed loop water circulation systems such as freezing water supply systems. After treatment, the pH of the freezing water gradually increases and the water becomes more alkaline. This helps to prevent corrosion and is beneficial to the cooling water system.

Example embodiments of the present invention can control scale formation by increasing the ability of the water to dissolve materials. The influence of a specific electromagnetic field may cause the formation of larger water clusters which can hold a greater amount of particles and ions. The formation of larger water clusters may be achieved by a change in the bonding between water molecules caused by higher energetic states under the influence of the electromagnetic field. Thus, the amount of calcium ions that can be dissolved in the water increases and super saturation of molecules can only be reached at a higher concentration.

Further, example embodiments of the present invention may allow scale control even at high hardness levels. Despite the inverse solubility of calcium hardness at high temperatures, many methods failed to address them. The example embodiments may be capable of dealing with the associated problems of scaling, even at boiling temperatures.

Special chelants may be used in chemical treatment methods if the water contains hardness. The example embodiments may be able to affect the way particles form structures at high temperatures. Soft powdery scale forms can still be obtained instead of hard precipitates when temperatures fall out of the typical temperature ranges for stability. For example, no hard scale is observed when cooling tower conditions were modelled after example embodiments of the present invention.

No further additional nutrient source may have to be added to the water when using the example embodiments. This may prevent occurrences such as eutrophication or algae growth, which are usually results of additional nutrient sources such as phosphates used in chemical treatment methods for corrosion prevention. If there are no sources of residual nutrients or other nutrient sources from the environment that result in an environment favourable for the microflora growth, the example embodiments may be able to kill algae and further prevent its growth under controlled conditions.

Example embodiments of the present invention may be designed to be used alone or combined with other methods in the example embodiment. The example embodiments may allow complementary use of other devices for further enhancing treatment effects. For example, copper and silver electrodes for electro-chemical treatment can be used together with an example embodiment to improve bacteria and algae control. Further, example embodiments may also be used together with filtering systems designed to remove suspended solids that are of high levels in certain applications and under certain environmental conditions. The standard method of cathodic protection, which is incompatible with most chemical treatment methods, may be further enhanced in its effects with the compatible use of the example embodiments. Example embodiments of the present invention may allow total elimination of use of chemicals which is environmental friendly as there may be no release of toxic compounds.

Further, example embodiments of the present invention may be suitable for use even under conditions which tend to affect the performance of typical water treatment devices. The conditions include but are not limited to the temperature of operation, especially water temperature, the amount of hardness detected in the water, the flow of the water through the system and the pH of the water. In specific, the example embodiments may have added advantages over typical water treatment devices.

For typical water treatment devices that uses magnetic fields, the required field strength may be obtained by a flow large enough to cause movements of ions through the orthogonal fields. However, example embodiments of the present invention may not need to maintain a minimum flow and may work well with static fluid bodies. In fact, the longer the retention time of the water, the greater the effect of the electromagnetic field subjected to the water.

Example embodiments of the present invention may be improved by increasing the capacity of the device. With the increased capacity, a smaller number of devices may be required for large-scale facilities. A reduced number of devices may require less synchronization. There may be better and more precise control of the devices. Improper synchronization may result in a counteractive result on the electromagnetic field strength.

Example embodiments of the present invention may be suitable for use within a range of facilities, including different subsystems within a same facility which avoids the need to use different treatment methods in one system. The example embodiments may e.g. be used for the various purposes of the chiller, condenser and boiler in a system at the same time.

Example embodiments of the present invention may require reduced testing of parameters to ascertain the treatment effects. This can be cost effective and hassle-free. There may also be less frequent bleed-off as the example embodiments may be able to handle a higher concentration of dissolved solids, resulting in a decrease of operational costs. Further, there is little or no organic and chemicals discharged with the water and no additional costs will be incurred to treat the effluent before it is discharged into e.g. a sewerage system.

Further, example embodiments of the present invention may be capable of allowing scale control for water with a high value of Langelier Saturation Index (LSI), which is an indication of the tendency of the water to form scale.

Example embodiments of the present invention may allow total elimination of use of chemicals. Chemical costs are high and special additives needed with their use further increase costs. The manual dosage may also result in increased labour costs. It is almost impossible to place too great a dosage at one time because the limits may be exceeded and the effects may not be optimal. Biocides such as bromine and chlorine have to be added in some existing water treatment devices. These are harmful and expensive. Moreover, these chemicals evaporate very quickly and have to be added regularly.

Example embodiments of the present invention may not require the electromagnetic inductor coil to be in direct contact with the water. The example embodiments allow easy installation, which further decreases costs.

To achieve increased effects, it may not be necessary to increase the size of the device of example embodiments of the present invention proportionally. Unlike the device of example embodiments, permanent magnets require a bigger size in order to generate the required field strength. In many cases, when the size is greatly increased, the effects are still not large enough for large-scale installations. For the example embodiments, the combination. of electric field and magnetic field may make the influence of the resulting field so great that there is neither a need for large-size magnets to generate high magnetic field strengths nor an electrical supply with a very large power generate a large electric field to achieve a similar field strength. In comparison, the example embodiments may save space and may be more convenient to install.

An example embodiment of the present invention was tested in boilers for controlling scale. At high temperatures, hard scale which should have been formed substantially, was not found at the high temperature surfaces. Moreover, it was observed that layers of white powdery coating were formed on the internal surfaces of the tubes when the boilers were opened for inspection. The layers of coatings were immediately easily removed with the flushing of the boiler tubes. This proved that the scale formed was not hard and did not necessitate techniques required for hard scale removal such as high-pressure jet washing, scrubbing or washing with strong acids. At the same time, the iron levels dropped from 6.30 ppm to 1.19 ppm and then to 0.03 ppm and were then consistently maintained at less than 0.01 ppm.

Another example embodiment of the present invention was tested in sites susceptible to high temperature trips. It was recommended to keep the hardness level at 100 ppm to prevent hard scale formation. This implied that the maximum allowable total dissolved solids level ranges from 250 ppm to 300 ppm. Frequent bleed off is required with existing techniques, resulting in great water losses. The example embodiment can allow the total dissolved solids levels to be maintained at 1000 ppm consistently and thus decreasing the bleed off rate.

Another example embodiment of the present invention was tested for controlling Legionella bacteria. The acceptable level of bacteria is recommended to be 10 cfu/ml. The example embodiment keeps the level of bacteria within the acceptable level. The level of Legionella detected is 1 cfu/ml in most instances. There are also cases whereby the reports of third parties showed that Legionella was not detected at all. Before installing the example embodiment, the total bacteria count was 170000 cfu/ml. After installation, the total bacteria count drops to 3760 cfu/ml and the lowest bacteria count measured is 260 cfu/ml.

Another example embodiment of the present invention was tested for preventing algae growth and enhancing the effects of the toxicity of the silver and copper ions to bacterial and algae growth as the example embodiment can be used with copper and silver electrode system. The use of the example embodiment produced better results in the control of algae growth as compared with chemical treatment. There were also clear differences in the coating formed on walls in a cooling tower environment, with the example embodiment for water treatment resulting in cleaner walls compared with chemical treatment which still resulted in thick layers of algae.

Another example embodiment of the present invention was tested for corrosion control. Control of corrosion can be analysed using the levels of iron ion levels. For example, pH was regularly maintained at levels 7.0 to 9.0 for a cooling tower environment. This helped in preventing corrosion as corrosion can be worsened by high acidity levels. For proof of good control of scale and corrosion, testing was conducted for the pH and the iron levels during testing of the example embodiment. Periodic inspections were carried out to observe the conditions of the boiler water and steam drums with regards to corrosion control and the prevention of scale formation.

Another example embodiment of the present invention was tested for controlling bacteria growth and corrosion. Typically, in a colling tower environment the bottom of the cooling tower may not be seen clearly. This is due to the great amount of corrosion products in the water, which made it murky. An iron level of 38 ppm was measured and the reddish brown colour of the water must be a result of high corrosion levels. The corrosion problems required the pipes to be replaced frequently due to serious leakage problems. During testing of the example embodiment in a cooling tower environment, the murky water became clear. A much lower level of total iron content maintained at less than 0.08 ppm shows that there is a decreased amount of corrosion. At the same time, the bacteria count dropped from 39000 cfu/ml to less than 1000 cfu/ml.

Another example embodiment of the present invention was tested for solving a number of problems in both boilers and cooling tower water systems within the same facility. For boilers, the result of the pH monitoring showed consistent readings of average 8 to 10. The total dissolved solids were maintained at high levels of 1000 ppm while the total iron levels were lower than 0.3 ppm. There was also little corrosion. On the other hand, in a cooling tower environment the example embodiment maintained similar readings of pH averaged at an estimated level of 8, which indicated that the waters were not acidic and did not have the tendency to increase corrosion. At the same time, the total dissolved solids levels indicated that the concentration of total dissolved solids was increased and the cooling towers were still in good operating conditions. Periodic readings of iron levels of less than 0.1 ppm showed that there was no significant corrosion occurring. The total bacteria count was also kept at average levels of 1000 cfu/ml and the highest level was 3300 cfu/ml. This indicates that the example embodiment may solve multiple problems in e.g. a cooling tower environment.

Another example embodiment of the present invention was tested to show that control of bacteria growth can be achieved by applying the frequency range of 5 kHz to 30 kHz. A better control of bacteria growth can be achieved using the frequency range of 150 kHz to 385 kHz. In addition, the use of the frequency range of 4.7 kHz to 145 kHz showed that the example embodiment was capable of decreasing the growth rate of the bacteria. There is only a 9% increase in bacteria count in water treated by the example embodiment as compared with a 12.5% increase in water treated by other water treatment methods.

Subsequently, when the bacteria undergoes the death phase, there was a greater drop in the bacteria count in water treated by the example embodiment as compared with water treated by other water treatment methods. The percentage decrease was two-fold, 60% instead of 30%.

Another example embodiment of the present invention was tested to show that the decrease in the bacteria count was much accelerated with the use of the example embodiment. A ten-fold decrease in the bacteria count after treatment by the example embodiment was observed, e.g. a 14% decrease instead of the 1.3% decrease. The untreated water sample favoured growth of bacteria, which remained at high levels and the experimental set up using the example embodiment had lower levels of bacteria consistently.

Another example embodiment of the present invention was tested to show that the frequency range of 5 kHz to 150 kHz was useful for controlling bacteria growth. The same trend of accelerated decrease in bacteria count was observed. The resulting bacteria count was also maintained at a level ten-fold lower.

Under the observation of scanning electron microscope, the bacteria population of similar samples showed differences in their morphology and structure as they undergo treatment over time. Curling flagella and increased clumping of bacteria cells were observed. This implied a possible loss of mobility of the bacteria cells which may prevent its locomotion within the water to source for nutrients, hence decreasing their ability to survive and multiply. Other effects observed were the mutation of bacteria species after the water was subjected to treatment and the phenomenon of cross-budding. This may be a sign to prevent replication of the bacteria species.

Example embodiments of the present invention may be used in a variety of applications including, but not limited to, process plants of industries such as the pesticide manufacturing sectors, hotels, image processing factories, hospital and shopping malls.

Figure 6:
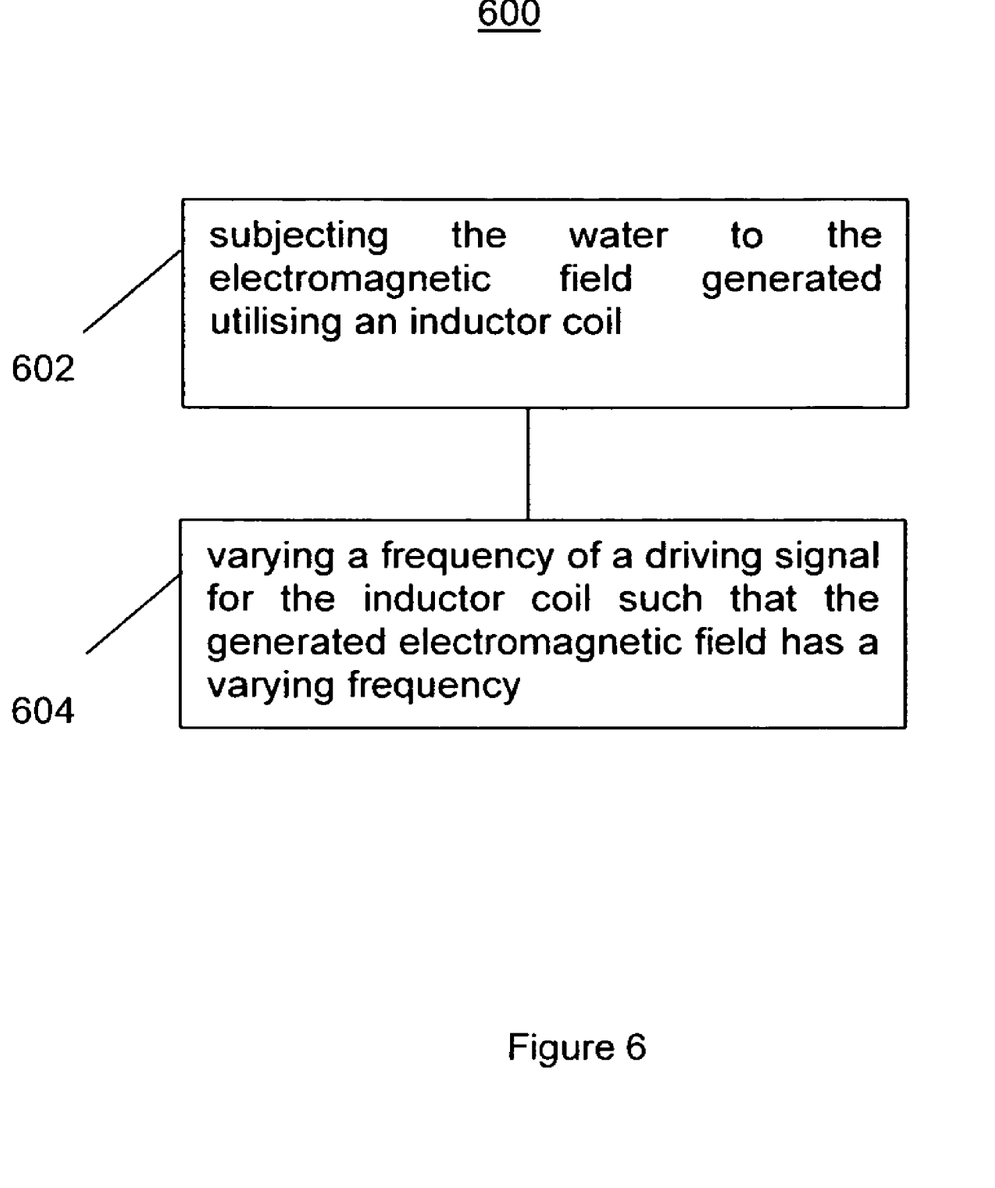
FIG. 6 shows a flow chart illustrating a method of water treatment using an electromagnetic field according to an example embodiment.

FIG. 6 shows a flow chart 600 illustrating a method of water treatment using an electromagnetic field in the example embodiment. At step 602, the water is subjected to the electromagnetic field generated utilising an inductor coil. At step 604, a frequency of a driving signal for the inductor coil is varied such that the generated electromagnetic field has a varying frequency.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

I claim:

1. A method for treating water using an electromagnetic field, the method comprising:
    subjecting the water to the electromagnetic field generated utilising an inductor coil; and
    varying a frequency of a driving signal for the inductor coil such that the generated electromagnetic field has a varying frequency, wherein the frequency is varied over a range between about 100 kHz and about 500 kHz.

2. The method as claimed in claim 1, wherein the frequency of the driving signal for the inductor coil is varied such that two or more treatment effects are electro-magnetically induced in the water.

3. The method as claimed in claim 2, wherein at least one of the two or more treatment effects relate to one or more of a group consisting of controlling scale formation, controlling bacteria growth, and forming magnetite to prevent corrosion.

4. The method as claimed in claim 1, wherein the electromagnetic field has a varying polarity.

5. The method as claimed in claim 1, further comprising simultaneously applying one or more existing treatment techniques to the water.

6. A system for treating water using an electromagnetic field, the system comprising:
    an inductor coil for subjecting the water to the electromagnetic field;
    a driver unit coupled to the inductor coil; and
    a controller unit coupled to the driver unit for varying a frequency of a driving signal generated by the driver unit such that the generated electromagnetic field has a varying frequency, wherein the frequency is between about 100 kHz and about 500 kHz.

7. The system as claimed in claim 6, wherein the inductor coil has an electromagnetic field with varying frequency such that two or more treatment effects are electro-magnetically induced in the water.

8. The system as claimed in claim 6, wherein the inductor coil has an electromagnetic field with varying polarity.

9. The system as claimed in claim 6, further comprising means of achieving two or more treatment effects, at least one of the two or more treatment effects relating to one or more of a group consisting of controlling scale formation, controlling bacteria growth, and forming magnetite to prevent corrosion.

10. The system as claimed in 6, wherein the controller unit comprises a programmable Integrated Circuit (IC).

11. The system as claimed in claim 6, wherein the driver unit comprises a bridge-type circuit and two half-bridge actuator ICs.

12. The system as claimed in claim 11, wherein the bridge-type circuit of the driver unit comprises a plurality of Metal Oxide Semiconductor Field Effect Transistors (MOSFETs).

13. The system as claimed in claim 6, further comprising a power source for providing supply voltages to components of the device.

14. The system as claimed claim 13, wherein the controller unit comprises a stabilizer circuit coupled between the power source and the controller unit.

15. The system as claimed in claim 13, wherein the power source provides an input signal to the driver unit for generation of the driving signal.

16. The system as claimed in claim 6, wherein the inductor coil is formed on a surface of a pipe, container or reservoir.

17. The system as claimed in claim 16, wherein the inductor coil is formed such that the pipe, container or reservoir is located substantially inside the coil or adjacent the coil.

18. The system as claimed in claim 6, wherein the inductor coil is formed on a separate carrier structure for disposal adjacent a pipe, container or reservoir.

* * * * *

UNITED STATES PATENT AND TRADEMARK OFFICE
CERTIFICATE OF CORRECTION

PATENT NO.         : 7,887,708 B2
APPLICATION NO.    : 11/241122
DATED              : February 15, 2011
INVENTOR(S)        : Hwee Hong Chew It is certified that error appears in the above-identified patent and that said Letters Patent is hereby corrected as shown below:

In column 14, please change line 1 of claim 14 to:

"The system as claimed in claim 13, wherein the controller"

Signed and Sealed this
Seventeenth Day of May, 2011

David J. Kappos
*Director of the United States Patent and Trademark Office*